United States Patent
Kim et al.

(10) Patent No.: US 11,301,174 B2
(45) Date of Patent: Apr. 12, 2022

(54) MEMORY SYSTEM, MEMORY CONTROLLER AND METHOD FOR OPERATING MEMORY SYSTEM

(71) Applicant: SK hynix Inc., Gyeonggi-do (KR)

(72) Inventors: Hyun Tae Kim, Seoul (KR); Hye Mi Kang, Gyeonggi-do (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/904,178

(22) Filed: Jun. 17, 2020

(65) Prior Publication Data

US 2021/0240390 A1 Aug. 5, 2021

(30) Foreign Application Priority Data

Jan. 30, 2020 (KR) .................. 10-2020-0010942

(51) Int. Cl.
  *G06F 3/06* (2006.01)

(52) U.S. Cl.
  CPC .......... *G06F 3/0659* (2013.01); *G06F 3/0611* (2013.01); *G06F 3/0616* (2013.01); *G06F 3/0652* (2013.01); *G06F 3/0673* (2013.01); *G06F 2212/7211* (2013.01)

(58) Field of Classification Search
  CPC .... G06F 3/0659; G06F 3/0611; G06F 3/0616; G06F 3/0652; G06F 2212/7211
  See application file for complete search history.

(56) References Cited

U.S. PATENT DOCUMENTS

| | | | |
|---|---|---|---|
| 9,146,875 B1 * | 9/2015 | Boyle | G06F 3/0679 |
| 10,248,333 B1 * | 4/2019 | Shah | G06F 12/1009 |
| 10,552,085 B1 * | 2/2020 | Chen | G06F 3/0647 |
| 2011/0145486 A1 * | 6/2011 | Owa | G06F 3/0616 |
| | | | 711/103 |
| 2013/0297894 A1 * | 11/2013 | Cohen | G06F 3/0611 |
| | | | 711/154 |
| 2017/0024137 A1 * | 1/2017 | Kanno | G06F 3/0644 |

FOREIGN PATENT DOCUMENTS

| | | |
|---|---|---|
| KR | 10-2012-0093608 | 8/2012 |
| KR | 10-2017-0111193 | 10/2017 |

* cited by examiner

*Primary Examiner* — Kalpit Parikh
(74) *Attorney, Agent, or Firm* — IP & T Group LLP

(57) ABSTRACT

A memory system, a memory controller and a method for operating the memory system. The memory system manages a hot data pool and a cold data pool, each of which includes at least one among a plurality of memory blocks, writes read only data to the cold data pool, and controls the hot data pool and the cold data pool in garbage collection and wear leveling, thereby classifying data, less frequently updated, into cold data and improving the performance of garbage collection and wear leveling.

11 Claims, 13 Drawing Sheets

FIG.10

HOT_DATA_POOL

| BLK # | E/W cycle count |
|-------|-----------------|
| 0     | 600             |
| 1     | 100             |
| 2     | 300             |
| 3     | 550             | max E/W cycle count = 600

COLD_DATA_POOL

| BLK # | E/W cycle count |
|-------|-----------------|
| 100   | 150             |
| 101   | 100             |
| 102   | 130             |
| 103   | 599             | max E/W cycle count = 599

=> exchange block between HOT_DATA_POOL and COLD_DATA_POOL

FIG.11

HOT_DATA_POOL

| BLK # | E/W cycle count |
|---|---|
| 101 | 100 |
| 1 | 100 |
| 2 | 300 |
| 3 | 550 | max E/W cycle count = 600 -> 550

COLD_DATA_POOL

| BLK # | E/W cycle count |
|---|---|
| 100 | 150 |
| 0 | 600 |
| 102 | 130 |
| 103 | 599 | max E/W cycle count = 599 -> 600

MEMORY SYSTEM, MEMORY CONTROLLER AND METHOD FOR OPERATING MEMORY SYSTEM

CROSS-REFERENCE TO RELATED APPLICATION

The present application claims priority to Korean Patent Application No. 10-2020-0010942, filed in the Korean Intellectual Property Office on Jan. 30, 2020, which is incorporated herein by reference in its entirety.

BACKGROUND

1. Technical Field

Various embodiments generally relate to a memory system, a memory controller and a method for operating the memory system.

2. Related Art

A memory system, e.g., a storage device, stores data on the basis of a request from a host, such as a computer, a mobile terminal (for example, a smartphone or a tablet), or any of various other electronic devices. The memory system may be a device configured to store data in a magnetic disk such as a hard disk drive (HDD), or a device configured to store data in a nonvolatile memory such as a solid state drive (SSD), a universal flash storage device (UFS), or an embedded MMC (eMMC) device.

The memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

The memory system may classify data written to the memory device as hot data or cold data depending on an access frequency. Hot data means data whose access frequency is higher than a set reference, and cold data means data whose access frequency is lower than the set reference. The memory system may process data, written to the memory device, in different ways depending on whether the data is designated as hot data or cold data.

SUMMARY

Various embodiments are directed to a memory system, a memory controller and a method for operating the memory system, capable of classifying data which is less frequently updated after being written to a memory device, into cold data.

Also, various embodiments are directed to a memory system, a memory controller and a method for operating the memory system, capable of improving the performance of garbage collection and wear leveling.

In one aspect, embodiments of the disclosure may provide a memory system including: a memory device including a plurality of memory blocks; and a memory controller configured to control the memory device.

The memory controller may manage a hot data pool and a cold data pool, each of which includes at least one among the plurality of memory blocks.

When receiving, from a host, a read only write command which instructs a write operation on read only data, the memory controller may write the read only data to the cold data pool.

The memory controller may exclude a memory block in the cold data pool from a target block of a garbage collection operation.

The memory controller may determine whether to exchange at least one among memory blocks in the cold data pool and at least one among memory blocks in the hot data pool with each other, in a wear leveling operation.

The memory controller may exchange, when a maximum value among erase-write cycle counts for the memory blocks in the hot data pool is greater than a maximum value among erase-write cycle counts for the memory blocks in the cold data pool, at least one among the memory blocks in the cold data pool and at least one among the memory blocks included in the hot data pool with each other in the wear leveling operation.

The memory controller may exchange a memory block having a minimum erase-write cycle count, among the memory blocks in the cold data pool, and a memory block having the maximum erase-write cycle count among the memory blocks in the hot data pool, with each other in the wear leveling operation.

In another aspect, embodiments of the disclosure may provide a memory controller including: a memory interface configured to communicate with a memory device including a plurality of memory blocks; and a control circuit configured to control the memory device.

The control circuit may manage a hot data pool and a cold data pool, each of which includes at least one among the plurality of memory blocks.

When receiving, from a host, a read only write command which instructs a write operation on read only data, the control circuit may write the read only data to the cold data pool.

The control circuit may exclude a memory block in the cold data pool from a target block of a garbage collection operation.

The control circuit may determine whether to exchange at least one among memory blocks in the cold data pool and at least one among memory blocks in the hot data pool with each other, in a wear leveling operation.

The control circuit may exchange, when a maximum value among erase-write cycle counts for the memory blocks in the hot data pool is greater than a maximum value among erase-write cycle counts for the memory blocks in the cold data pool, at least one among the memory blocks in the cold data pool and at least one among the memory blocks in the hot data pool with each other in the wear leveling operation.

The control circuit may exchange a memory block having a minimum erase-write cycle count, among the memory blocks in the cold data pool, and a memory block having the maximum erase-write cycle count, among the memory blocks in the hot data pool, with each other in the wear leveling operation.

In still another aspect, a method for operating a memory system may include generating a hot data pool and a cold data pool, each of which includes at least one among a plurality of memory blocks in a memory device.

The method for operating a memory system may include receiving, from a host, a read only write command which instructs a write operation on read only data.

The method for operating a memory system may include writing the read only data to the cold data pool.

The method for operating a memory system may further include excluding a memory block in the cold data pool from a target block of a garbage collection operation.

The method for operating a memory system may further include determining whether to exchange at least one among memory blocks in the cold data pool and at least one among memory blocks in the hot data pool with each other, in a wear leveling operation.

When a maximum value among erase-write cycle counts for the memory blocks in the hot data pool is greater than a maximum value among erase-write cycle counts for the memory blocks in the cold data pool, at least one among the memory blocks in the cold data pool and at least one among the memory blocks in the hot data pool may be exchanged with each other in the wear leveling operation. At this time, a memory block having a minimum erase-write cycle count, among the memory blocks in the cold data pool, and a memory block having the maximum erase-write cycle count, among the memory blocks in the hot data pool, may be exchanged with each other in the wear leveling operation.

In still another aspect, an operating method of a controller may include controlling a memory device, which includes cold and hot data regions, to store write data in the cold data region in response to a write request indicating that the write data is read only data.

The operating method of a controller may include controlling the memory device to perform garbage collection and wear leveling operations on the cold and hot data regions.

According to the embodiments of the disclosure, it is possible to classify data which is less frequently updated after being written to a memory device, into cold data.

Also, according to the embodiments of the disclosure, it is possible to improve the performance of garbage collection and wear leveling.

BRIEF DESCRIPTION OF THE DRAWINGS

FIG. 10 is a diagram illustrating a condition under which the memory system in accordance with an embodiment of the disclosure exchanges memory blocks between a hot data pool and a cold data pool.

FIG. 11 is a diagram illustrating an operation for the memory system in accordance with an embodiment of the disclosure to exchange memory blocks between the hot data pool and the cold data pool under the condition of FIG. 10.

DETAILED DESCRIPTION

Hereinafter, embodiments of the disclosure are described in detail with reference to the accompanying drawings. Throughout the specification, reference to "an embodiment," "another embodiment" or the like is not necessarily to only one embodiment, and different references to any such phrase are not necessarily to the same embodiment(s).

Figure 1:
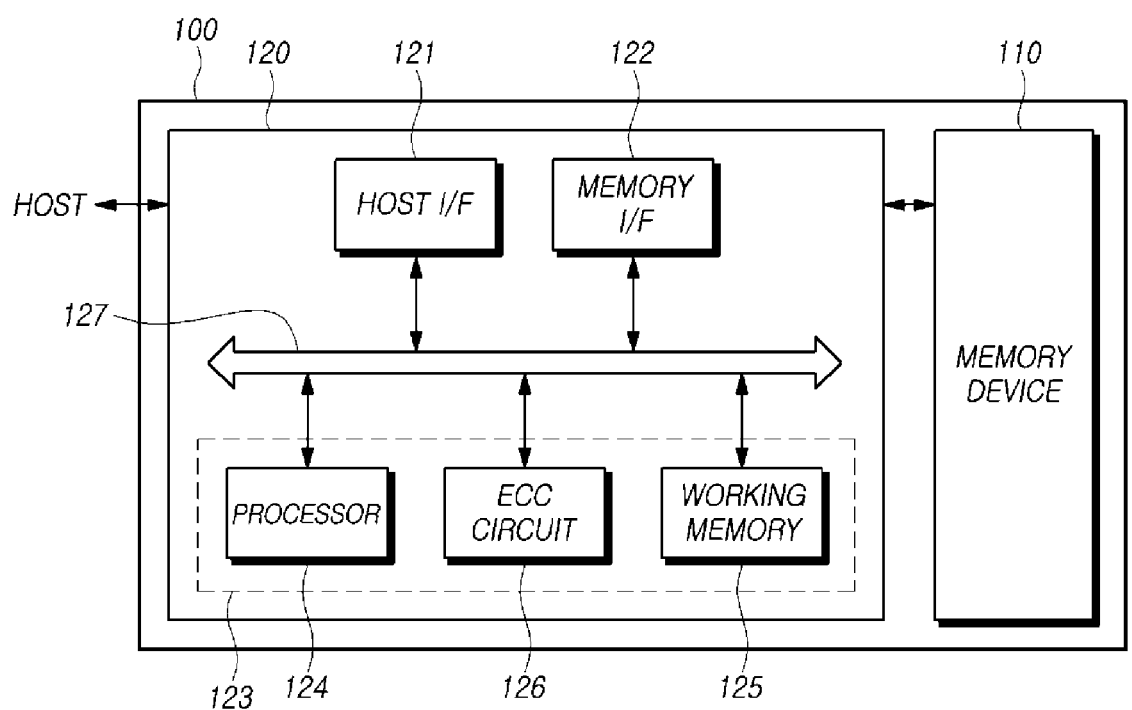
FIG. 1 is a schematic diagram illustrating a configuration of a memory system according to an embodiment of the disclosure.

FIG. 1 is a schematic diagram illustrating a configuration of a memory system 100 according to an embodiment of the disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells") configured to store data. The memory cell array may exist inside a memory block.

For example, the memory device 110 may be implemented as any of various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (SU-RAM).

The memory device 110 may be implemented in a three-dimensional array structure. Embodiments of the disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array, which is selected by the address. That is, the memory device 110 may perform an operation corresponding to the received command in a memory area of the memory device having a physical address corresponding to the received address from the controller.

For example, the memory device 110 may perform a program operation, a read operation, an erasure operation, and the like. During the program operation, the memory device 110 may program data in the area selected by the address. During the read operation, the memory device 110 may read data from the area selected by the address. During the erasure operation, the memory device 110 may erase data stored in the area selected by the address.

The memory controller 120 may control write (program), read, erasure, and background operations with regard to the memory device 110. The background operation may include, for example, a garbage collection operation (GC), a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when the memory controller 120 directs the memory device 110 to perform one or more background operations.

The memory controller 120 and the host may be separate devices. In another embodiment, the memory controller 120 and the host may be integrated and implemented as a single device. In the following description, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations for overall control of the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) so as to control the operation of the memory controller 120. In other words, the processor 124 may control the overall operation of the memory controller 120 and, in order to perform a logical operation, may execute (drive) firmware loaded into the working memory 125 during booting.

The firmware refers to a program executed inside the memory system 100, and may include various functional layers.

For example, the firmware may include a flash translation layer (FTL) configured to translate between a logical address that the host HOST requests the memory system 100 to provide and a physical address of the memory device 110, a host interface layer (HIL) configured to interpret a command that the host HOST issues to the memory system 100 (storage device) and to deliver the same to the FTL, and/or a flash interface layer (FIL) configured to deliver a command issued by the FTL to the memory device 110.

For example, the firmware may be stored in the memory device 110, then loaded into the working memory 125.

The working memory 125 may store firmware, program codes, commands, or pieces of data necessary to drive the memory controller 120. The working memory 125 may be a volatile memory implemented by, for example, a static RAM (SRAM), a dynamic RAM (DRAM), and/or a synchronous RAM (SDRAM).

The error detection/correction circuit 126 may be configured to detect one or more error bits of target data by using an error correction code, and to correct the detected error bit(s). For example, the target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect an error bit, sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail." If the BER is lower than the reference value, the error detection/correction circuit 126 may determine that the corresponding sector is correctable or "a pass."

The error detection/correction circuit 126 may perform error detection and correction operations successively with regard to all pieces of read data. When a sector included in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect one or more sectors deemed uncorrectable in the read data. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. One or more of these elements may be omitted, or one or more of these elements may be integrated into a single element. Also, in some cases, the memory controller 120 may include one or more other constituent elements, in addition to those mentioned above.

Hereinafter, the memory device 110 is described in more detail with reference to FIG. 2.

Figure 2:
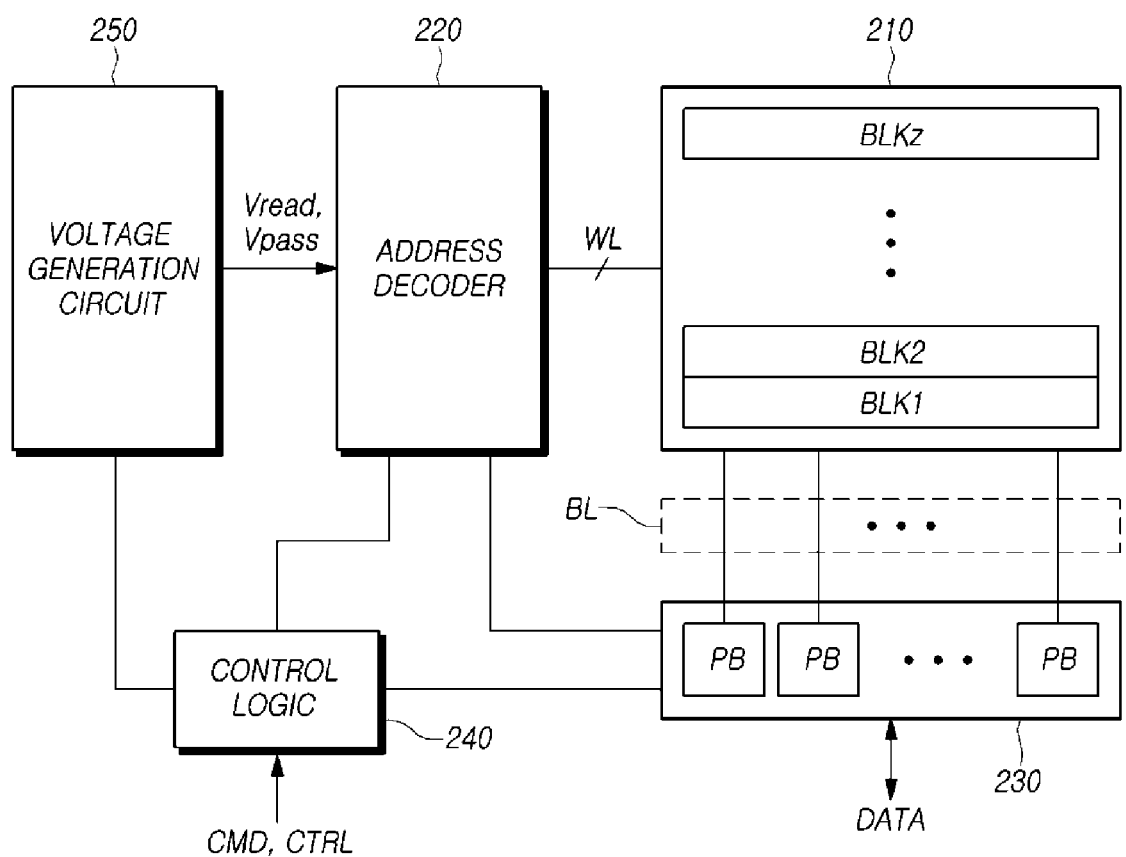
FIG. 2 is a block diagram schematically illustrating a memory device according to an embodiment of the disclosure.

FIG. 2 is a block diagram schematically illustrating a memory device 110 according to an embodiment of the disclosure.

Referring to FIG. 2, the memory device 110 may include a memory cell array 210, an address decoder 220, a read/write circuit 230, a control logic 240, and a voltage generation circuit 250.

The memory cell array 210 may include multiple memory blocks BLK1-BLKz (z is a natural number equal to or larger than 2).

In the multiple memory blocks BLK1-BLKz, multiple word lines WL and multiple bit lines BL may be disposed in an intersecting arrangement, and multiple memory cells MC may be arranged at the respective intersections.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, which may have a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells in the memory cell array 210 may be a single-level cell (SLC) configured to store one bit of data, a multi-level cell (MLC) configured to store two bits of data, or a triple-level cell (TLC) configured to store three bits of data. However, storage capacity cells may also be used. For example, each of the multiple memory cells in the memory cell array 210 may be a quad-level cell (QLC) configured to store four bits of data, or a memory cell configured to store at least five bits of data.

Referring to FIG. 2, the address decoder 220, the read/write circuit 230, the control logic 240, and the voltage generation circuit 250 may collectively operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

The address decoder 250 may apply the read voltage Vread to a selected word line WL inside a selected memory block, during an operation of applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some cases, may further include a cache buffer in charge of a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
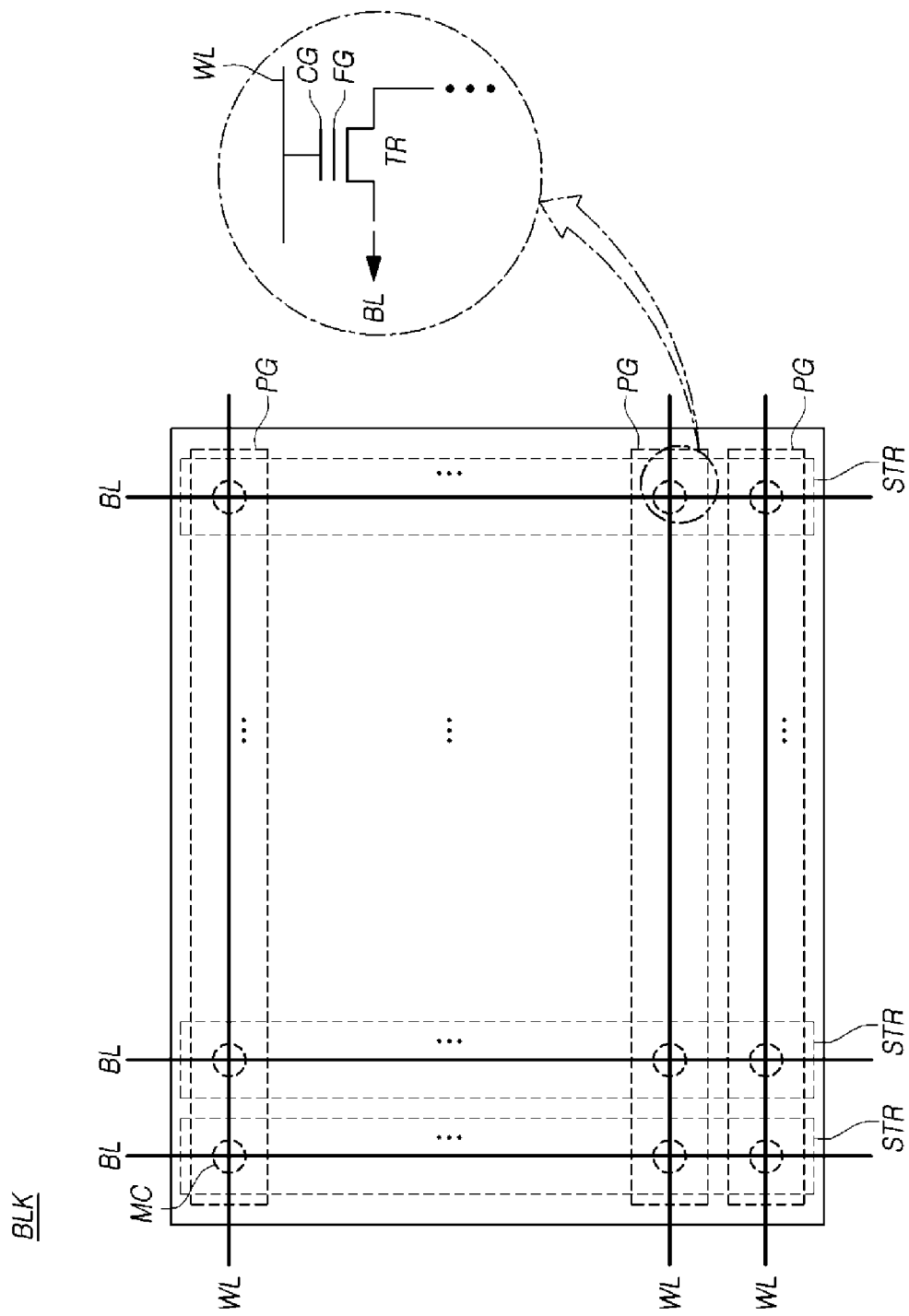
FIG. 3 is a diagram schematically illustrating a memory block of a memory device according to an embodiment of the disclosure.

FIG. 3 is a diagram schematically illustrating a memory block BLK of a memory device 110 according to an embodiment of the disclosure.

Referring to FIG. 3, a memory block BLK included in the memory device 110 may be arranged and configured in such direction that multiple pages PG and multiple strings TTR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

In the case of a memory block structure as illustrated in FIG. 3, a read operation and a program operation (write operation) may be performed page by page, and an erasure operation may be performed memory block by memory block.

Figure 4:
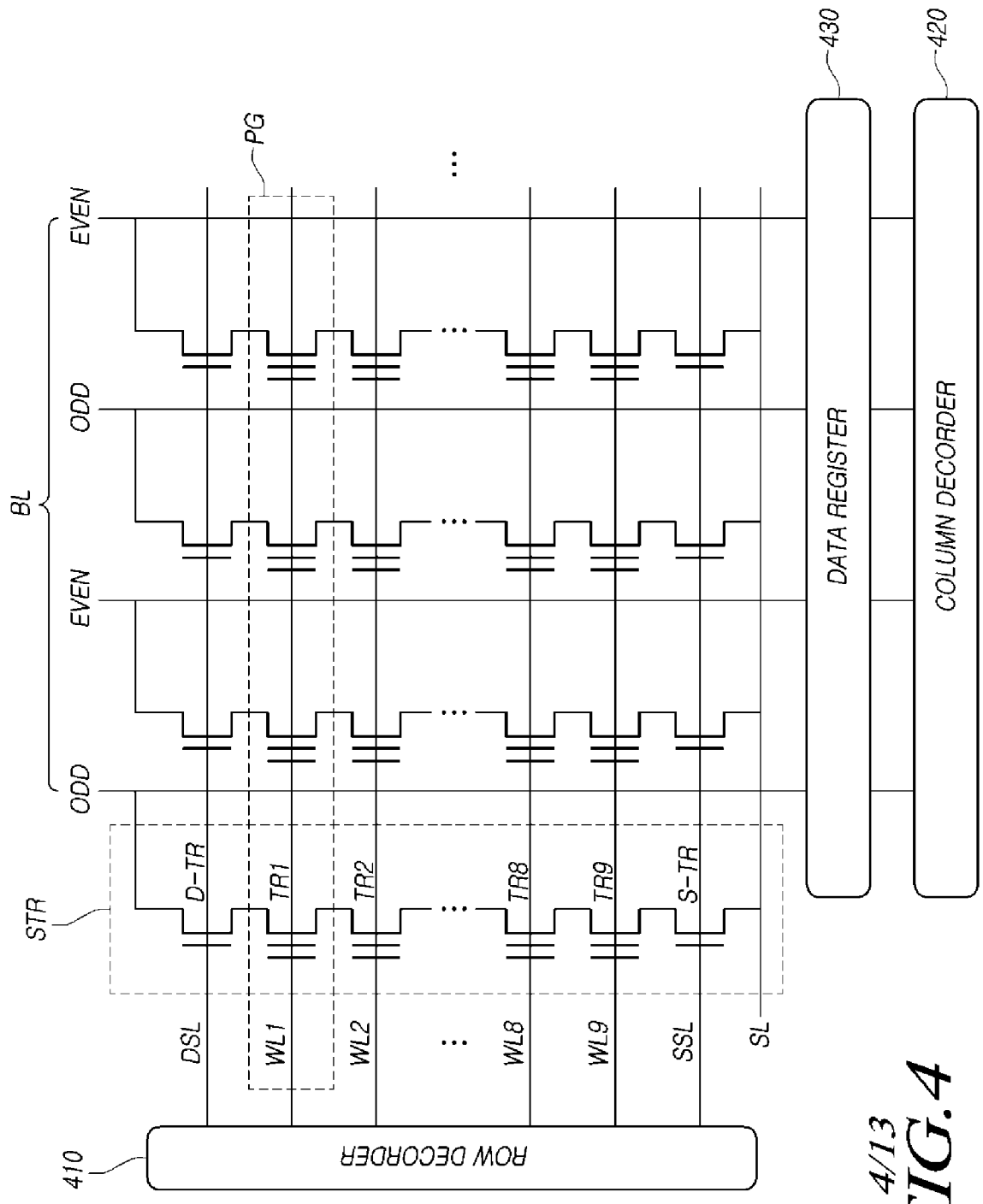
FIG. 4 is a diagram illustrating the structure of word lines and bit lines of a memory device according to an embodiment of the disclosure.

FIG. 4 is a diagram illustrating a structure of word lines WL and bit lines BL of a memory device 110 according to an embodiment of the disclosure.

Referring to FIG. 4, the memory device 110 has a core area in which memory cells MC are concentrated, and an auxiliary area which corresponds to the remaining (non-core) area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may be disposed between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 420 while being distinguished between odd-numbered bit lines BL and even-numbered bit lines BL.

For accessing a memory cell MC, the address may be entered to the core area first through the input/output end and then through the row decoder 410 and the column decoder 420 such that a corresponding target memory cell can be designated. As used herein, designating a target memory cell refers to accessing one of the memory cells MC at the sites of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC in different positions among memory cells MC connected in series may differ slightly, due to the voltage drop across the preceding memory cell MC.

The data register 430 plays an integral role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade the overall performance of the memory device 110.

Referring to the example illustrated in FIG. 4, in one string STR, multiple transistors TR1-TR9 connected to multiple word lines WL1-WL9 may exist. The areas in which the multiple transistor TR1-TR9 exist correspond to memory cells MC. As used herein, the multiple transistors TR1-TR9 refer to transistors including control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned on both ends of the corresponding string STR and deliver/block signals.

The memory system 100 needs to fill the target memory cell MC of the bit line BL to be programmed with electrons during a program operation. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may supply a voltage (for example, +20V) to the substrate through a source line SL during an erasure operation. The memory system 100 floats both the first selection transistor D-TR and the second selection transistor S-TR during an erasure operation, thereby generating an infinite resistance. As a result, the role of the first selection transistor D-TR and that of the second selection transistor S-TR may be removed, and electrons may operate only between the floating gate FG and the substrate due to the potential difference.

Figure 5:
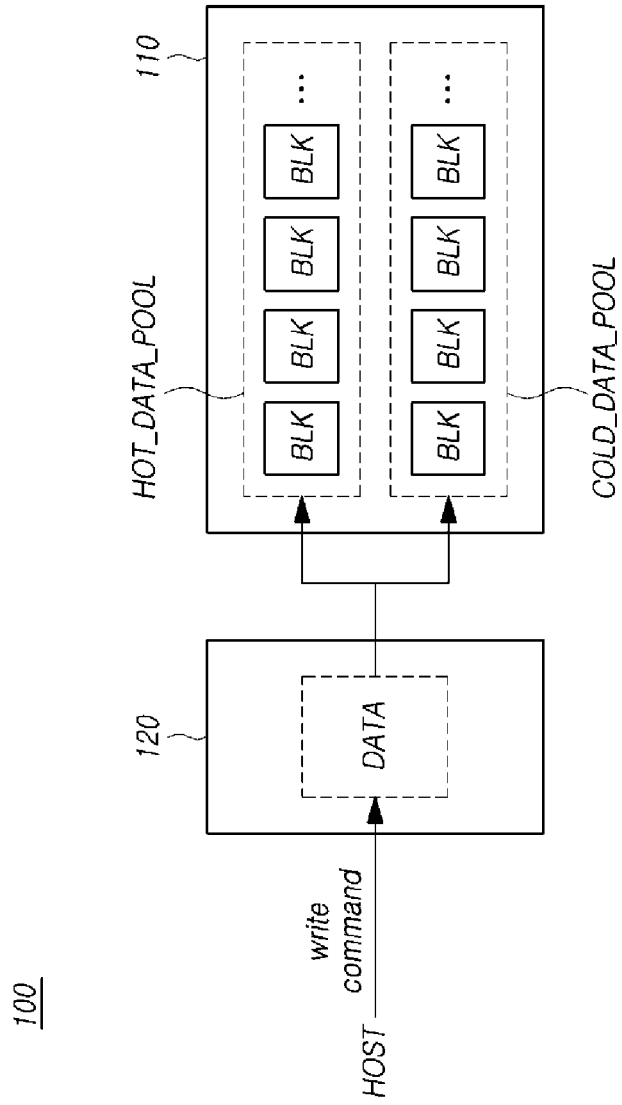
FIG. 5 is a diagram schematically illustrating a configuration of a memory system in accordance with an embodiment of the disclosure.

FIG. 5 is a diagram schematically illustrating a configuration of a memory system 100 in accordance with embodiments of the disclosure.

Referring to FIG. 5, a memory controller 120 of the memory system 100 may manage a hot data pool (HOT_DATA_POOL) and a cold data pool (COLD_DATA_POOL). The hot data pool includes at least one memory block in which hot data is stored, and the cold data pool includes at least one memory block in which cold data is stored. Each of the hot data pool and the cold data pool may include at least one of the plurality of memory blocks BLK in the memory device 110.

The memory controller 120 may manage the hot data pool and the cold data pool in units of super memory blocks, respectively. A super memory block is a logical block including one or more of the plurality of memory blocks BLK in the memory device 110. When writing data to a super memory block, the memory controller 120 may write the data by distributing the data over one or more memory blocks BLK included in the super memory block.

The memory controller 120 may receive, from a host (HOST), a write command which instructs an operation of writing data. The memory controller 120 may write the data, indicated by the write command, to the hot data pool or the cold data pool.

The memory controller 120 may determine whether to write the data, indicated by the write command, to the hot data pool or the cold data pool.

Hereunder, an operation of the memory controller 120 to determine whether to write data, indicated by a write command, to the hot data pool or the cold data pool depending on information indicated by the write command is described with reference to FIG. 6.

Figure 6:
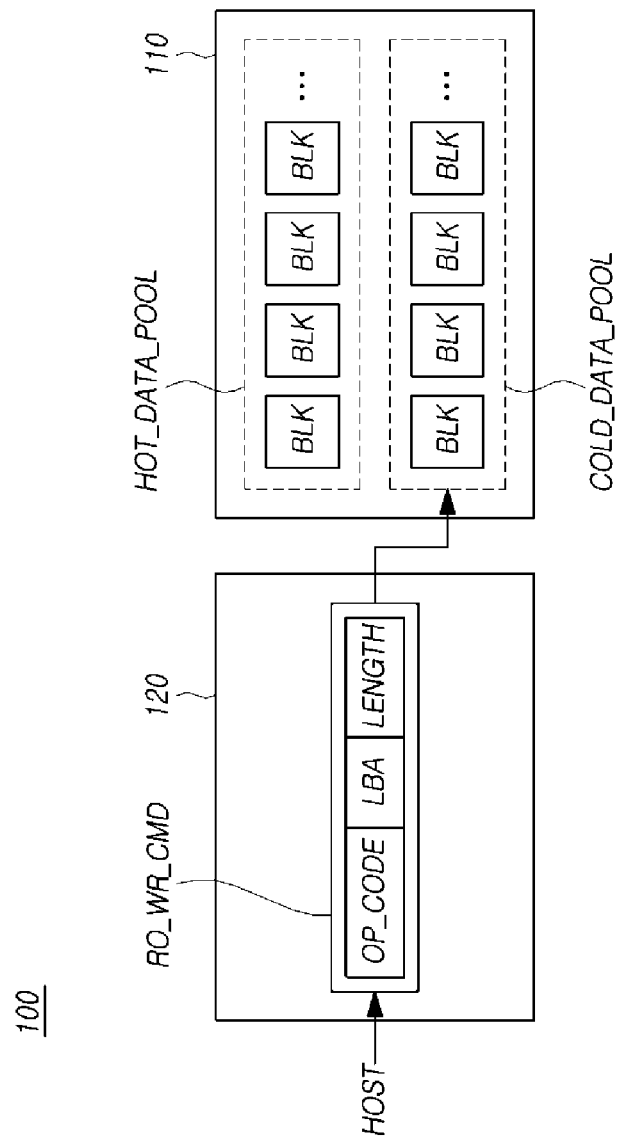
FIG. 6 is a diagram illustrating an operation for the memory system in accordance with an embodiment of the disclosure to process a read only write command.

FIG. 6 is a diagram illustrating an operation for the memory system 100 in accordance with an embodiment of the disclosure to process a read only write command RO_WR_CMD.

The read only write command (RO_WR_CMD) is a write command which instructs a write operation on read only data. The memory controller 120 of the memory system 100 may determine, based on an operation code (OP_CODE) included in a write command received from the host, whether the corresponding write command is the read only write command.

Read only data corresponding to the read only write command may be determined in various ways.

As an example, read only data may be data for a multimedia file (e.g., a photo/video). That is to say, when writing the data for a multimedia file to the memory system 100, the host may transmit the read only write command to the memory system 100.

As another example, read only data may be data for an OS file as a file included in an operating system (OS). Since the OS is not changed for a long time after initial installation, when writing the data for an OS file to the memory system 100, the host may transmit the read only write command to the memory system 100.

As still another example, read only data may be data for a library file (a static library file/dynamic library file). Since the library file is also not changed for a long time after initial installation, when writing the data for a library file to the memory system 100, the host may transmit the read only write command to the memory system 100.

As yet another example, read only data may be data which is determined, by the host, as being less frequently updated after being written to the memory system 100. In other words, read only data may be data whose update frequency during a set time period (e.g., 1 h) is determined, by the host, as being equal to or less than a set threshold count (e.g., 5). When writing such data to the memory system 100, the host may transmit the read only write command to the memory system 100 to indicate, to the memory system 100, that the corresponding data is to be updated equal to or less than the set threshold count during the set time period. The read only data may be indicated by information on a logical block address LBA and a length (LENGTH) included in the read only write command.

The memory controller 120 may write the read only data corresponding to the read only write command to the cold data pool instead of the hot data pool. The memory controller 120 may manage the read only data as cold data by writing the read only data to the cold data pool.

The reason why, as such, the memory controller 120 determines whether to write data to the cold data pool, based on the information of a write command received from the host, is as follows.

In general, whether data is hot data or cold data may be determined depending on the number of times the corresponding data is accessed, i.e., read or written (denoted as an access count) over a specific time period. Since the access count of particular data increases with the lapse of time, there is a problem in that even data with a low read or write frequency may be eventually classified as hot data.

In the case where data (e.g., data of a multimedia file) with a low update frequency after being written is managed as cold data from a time when the data is written to the memory device 110, the performance of a garbage collection or wear leveling operation may be advantageously improved. This is because when, a memory block in which the corresponding data is stored is excluded in advance as a target of garbage collection or wear leveling, the number of memory blocks as a search target may be reduced and thus garbage collection or wear leveling may be more quickly performed.

However, a problem is caused in that such an attribute of data can be checked in the host but cannot be checked in the memory system 100. Therefore, by indicating an attribute of data (whether the corresponding data is cold data) when the host writes the data to the memory system 100, the memory system 100 may manage the corresponding data as cold data.

The memory controller 120 of the memory system 100 may determine that data written to the cold data pool, as cold data, has a low possibility to be subsequently updated.

Hereunder, an operation in which the memory system 100 manages the hot data pool and the cold data pool during a background operation (e.g., garbage collection/wear leveling) is described.

Figure 7:
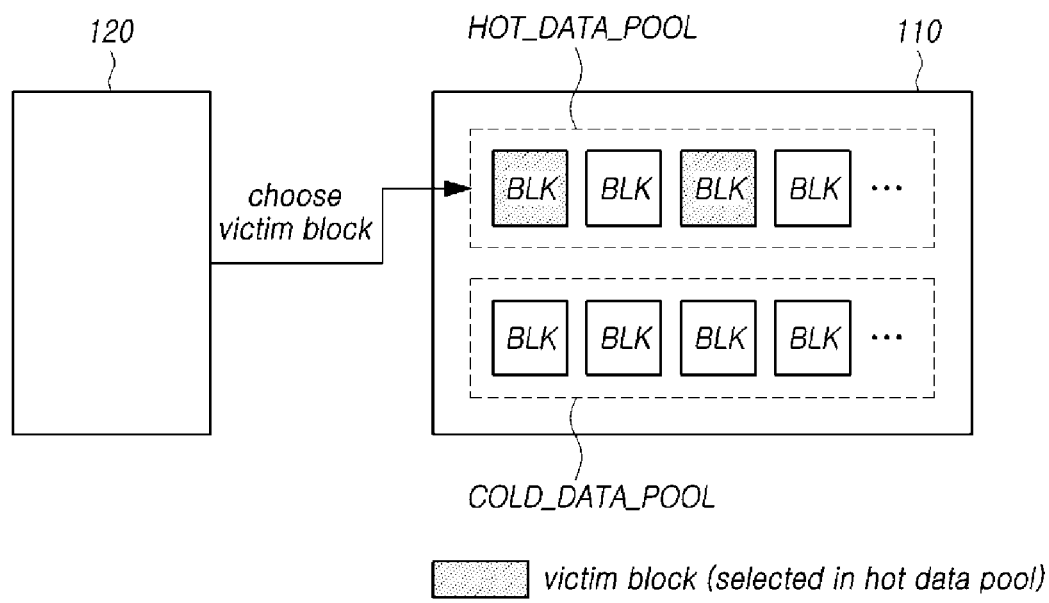
FIG. 7 is a diagram illustrating an operation for the memory system in accordance with an embodiment of the disclosure to execute garbage collection.

FIG. 7 is a diagram illustrating an operation for the memory system 100 in accordance with the embodiments of the disclosure to execute garbage collection.

When performing a garbage collection operation, the memory controller 120 of the memory system 100 may exclude memory blocks in the cold data pool, from target blocks of the garbage collection operation. Namely, the memory controller 120 may select victim blocks of the garbage collection only among memory blocks in the hot data pool.

The reason why, as such, the memory controller 120 excludes the memory blocks, in the cold data pool, from the target blocks of the garbage collection operation resides in that, since data stored in the cold data pool is less frequently updated, the memory controller 120 may determine that the number of pages which are in an invalid state due to an update operation, among pages included in the memory blocks in the cold data pool, is small.

As such, as the memory controller 120 selects victim blocks among only the memory blocks included in the hot data pool instead of selecting victim blocks among all memory blocks in the garbage collection operation, it is possible to reduce a time required for the garbage collection operation. Through this, the performance of the garbage collection operation may be improved.

Figure 8:
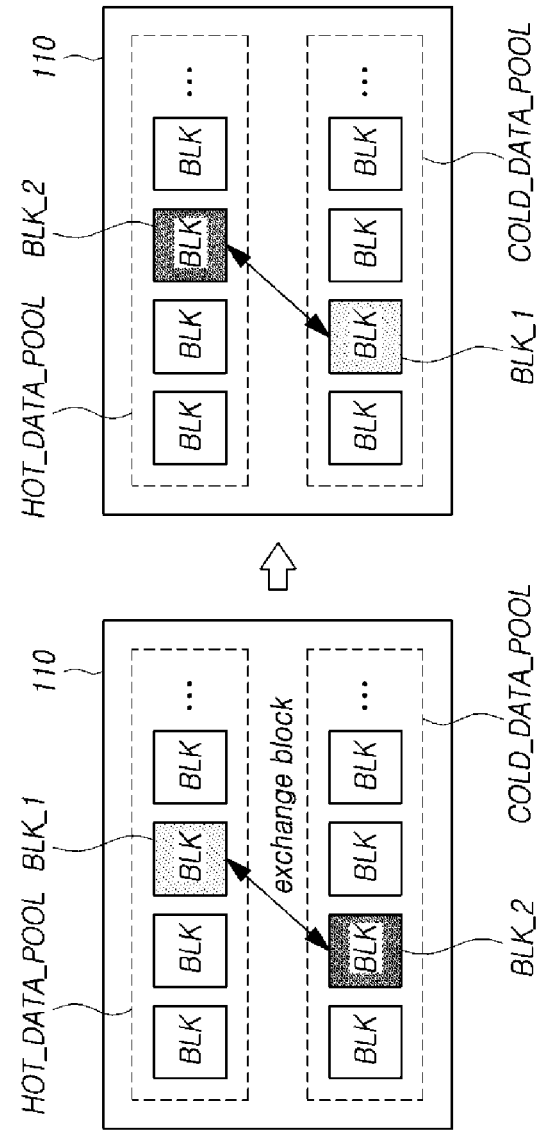
FIG. 8 is a diagram illustrating an operation for the memory system in accordance with an embodiment of the disclosure to execute wear leveling.

FIG. 8 is a diagram illustrating an operation for the memory system 100 in accordance with an embodiment of the disclosure to execute wear leveling.

In a wear leveling operation, the memory controller 120 of the memory system 100 may determine whether to exchange at least one of the memory blocks in the cold data pool and at least one of the memory blocks in the hot data pool with each other.

As a process in which data is written to the hot data pool is repeated, a memory block which stores data with a low update possibility may exist among the memory blocks in the hot data pool. Also, as time goes by, a memory block which stores data with a high update possibility may exist among the memory blocks in the cold data pool.

In this case, the memory controller 120 may exchange at least one memory block in the cold data pool and at least one memory block in the hot data pool with each other, at the time of wear leveling, and thereby, may control data with a high update possibility to be stored in the hot data pool and data with a low update possibility to be stored in the cold data pool.

In FIG. 8, the memory controller 120 may exchange a memory block BLK_1 in the hot data pool and a memory block BLK_2 in the cold data pool with each other, such that BLK_1 is included in the COLD_DATA_POOL and BLK_2 is included in the HOT_DATA_POOL.

Figure 9:
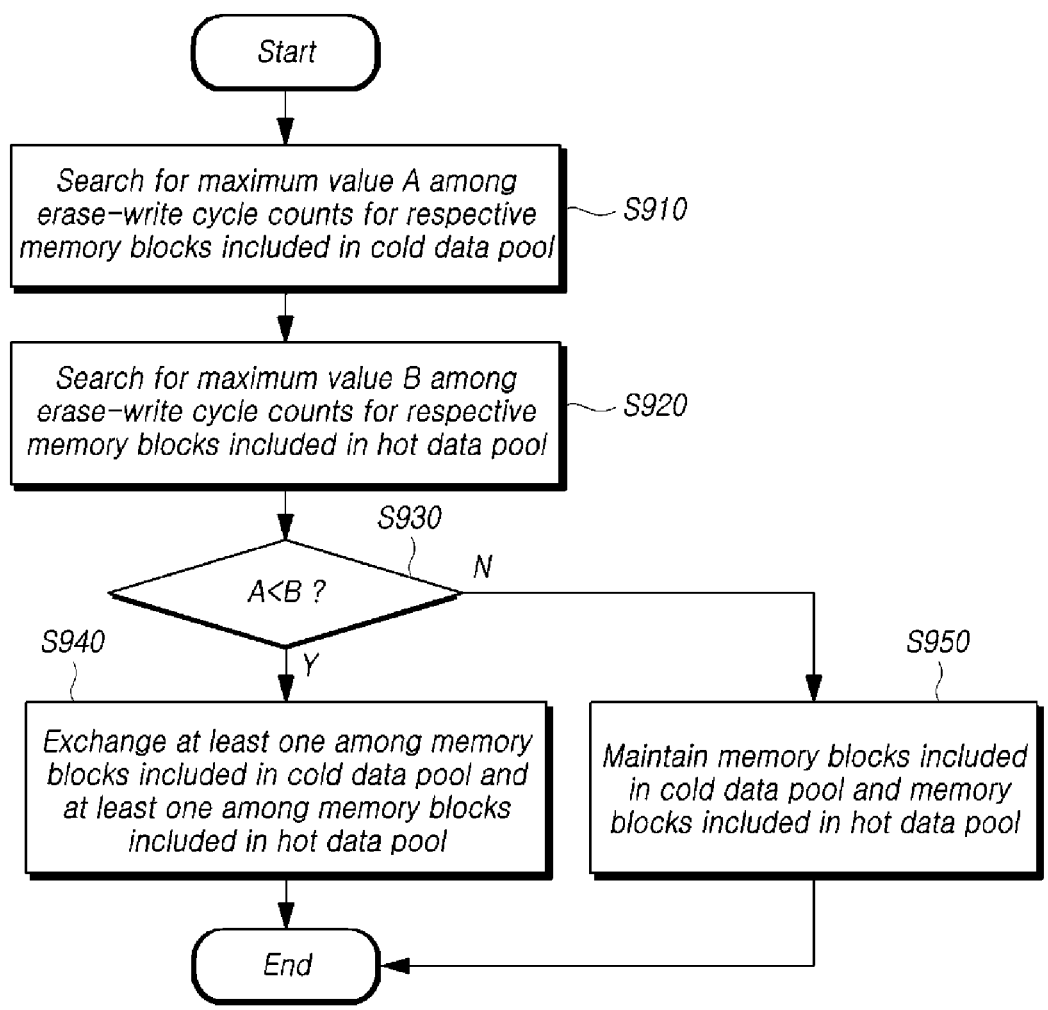
FIG. 9 is a flow chart to assist in the explanation of a method for the memory system in accordance with an embodiment of the disclosure to determine whether to exchange memory blocks, in a wear leveling operation.

FIG. 9 is a flow chart to assist in the explanation of a method for the memory system 100 in accordance with an embodiment of the disclosure to determine whether to exchange memory blocks, in a wear leveling operation.

The memory controller 120 of the memory system 100 may search for a maximum value A among erase-write cycle counts for memory blocks in the cold data pool (S910).

The memory controller 120 may search for a memory block with a highest erase-write cycle count value among the memory blocks in the cold data pool, and then, may set the erase-write cycle count value of the memory block found in the search to A.

The memory controller 120 of the memory system 100 may search for a maximum value B among erase-write cycle counts for memory blocks in the hot data pool (S920).

The memory controller 120 may search for a memory block with a highest erase-write cycle count value among the memory blocks in the hot data pool, and then, may set the erase-write cycle count value of the memory block found in the search to B.

In FIG. 9, a scenario in which the memory controller 120 searches for the maximum value A among the erase-write cycle counts for the memory blocks in the cold data pool before searching for the maximum value B among the erase-write cycle counts for the memory blocks in the hot data pool. However, these searches may be performed simultaneously, or the memory controller 120 may search for B before A.

The memory controller 120 compares the value A found at step S910 and the value B found at step S920, and thereby, determines whether the value B is greater than the value A (S930). A specific example of comparing the value A and the value B is described below with reference to FIG. 10.

In the case where the value B is greater than the value A (S930-Y), that is, when the maximum value among the erase-write cycle counts for the memory blocks in the hot data pool is greater than the maximum value among the erase-write cycle counts for the memory blocks in the cold data pool, the memory controller 120 may exchange at least one of the memory blocks in the cold data pool and at least one of the memory blocks in the hot data pool with each other (S940). A specific example of exchanging a memory block in the cold data pool and a memory block in the hot data pool is described below with reference to FIG. 11.

On the other hand, in the case where the value B is equal to or less than the value A (S930-N), that is, when the maximum value among the erase-write cycle counts for the memory blocks in the hot data pool is equal to or less than the maximum value among the erase-write cycle counts for the memory blocks in the cold data pool, the memory controller 120 may maintain the memory blocks in their respective pools (S950). That is, no exchange operation is performed.

FIG. 10 is a diagram illustrating a condition under which the memory system 100 in accordance with an embodiment of the disclosure exchanges memory blocks between the hot data pool and the cold data pool.

Referring to FIG. 10, among the memory blocks i in the hot data pool (HOT_DATA_POOL), an erase-write cycle count of block 0 is 600, an erase-write cycle count of block 1 is 100, an erase-write cycle count of block 2 is 300, and an erase-write cycle count of block 3 is 550. Thus, among these memory blocks in the hot data pool, block 0 has the highest erase-write cycle count of 600. 600 thus represents the maximum value of the erase-write cycle counts in the hot data pool.

On the other hand, among the memory blocks in the cold data pool (COLD_DATA_POOL), an erase-cycle count of block 100 is 150, an erase-write cycle count of block 101 is 100, an erase-write cycle count of block 102 is 130, and an erase-write cycle count of block 103 is 599. Thus, among these memory blocks in the cold data pool, block 103 has the highest erase-write cycle count of 599. 599 thus represents the maximum value of the erase-write cycle counts in the hot data pool.

In this case, because the maximum value 600 among the erase-write cycle counts for the memory blocks in the hot data pool is greater than the maximum value 599 among the erase-write cycle counts for the memory blocks in the cold data pool, the memory controller 120 of the memory system 100 may exchange at least one memory block in the cold data pool and at least one memory block in the hot data pool.

Hereunder, which memory blocks among the memory blocks included in the hot data pool and the cold data pool are to be exchanged is described with reference to FIG. 11.

FIG. 11 is a diagram illustrating an operation for the memory system 100 in accordance with an embodiment of the disclosure to exchange memory blocks between the hot data pool and the cold data pool under the condition of FIG. 10.

Referring to FIG. 11, the memory controller 120 of the memory system 100 may exchange a memory block having a minimum erase-write cycle count, among the memory blocks in the cold data pool (COLD_DATA_POOL), and a memory block having a maximum erase-write cycle count, among the memory blocks included in the hot data pool (HOT_DATA_POOL), with each other.

In FIG. 11, the memory controller 120 may exchange the memory block 101 having the minimum erase-write cycle count of 100 among the memory blocks in the cold data pool and the memory block 0 having the maximum erase-write cycle count of 600 among the memory blocks included in the hot data pool with each other.

As a result of exchanging the memory block 101 and the memory block 0, a maximum value among the erase-write cycle counts for the memory blocks in the hot data pool is reduced from 600 to 550. Also, maximum value among the erase-write cycle counts for the memory blocks in the cold data pool is increased from 599 to 600. Therefore, the maximum value of 550 among the erase-write cycle counts for the memory blocks in the hot data pool becomes less than the maximum value of 600 among the erase-write cycle counts for the memory blocks in the cold data pool. Thus, under this condition, the memory controller 120 no longer exchanges memory blocks between the hot data pool and the cold data pool.

Figure 12:
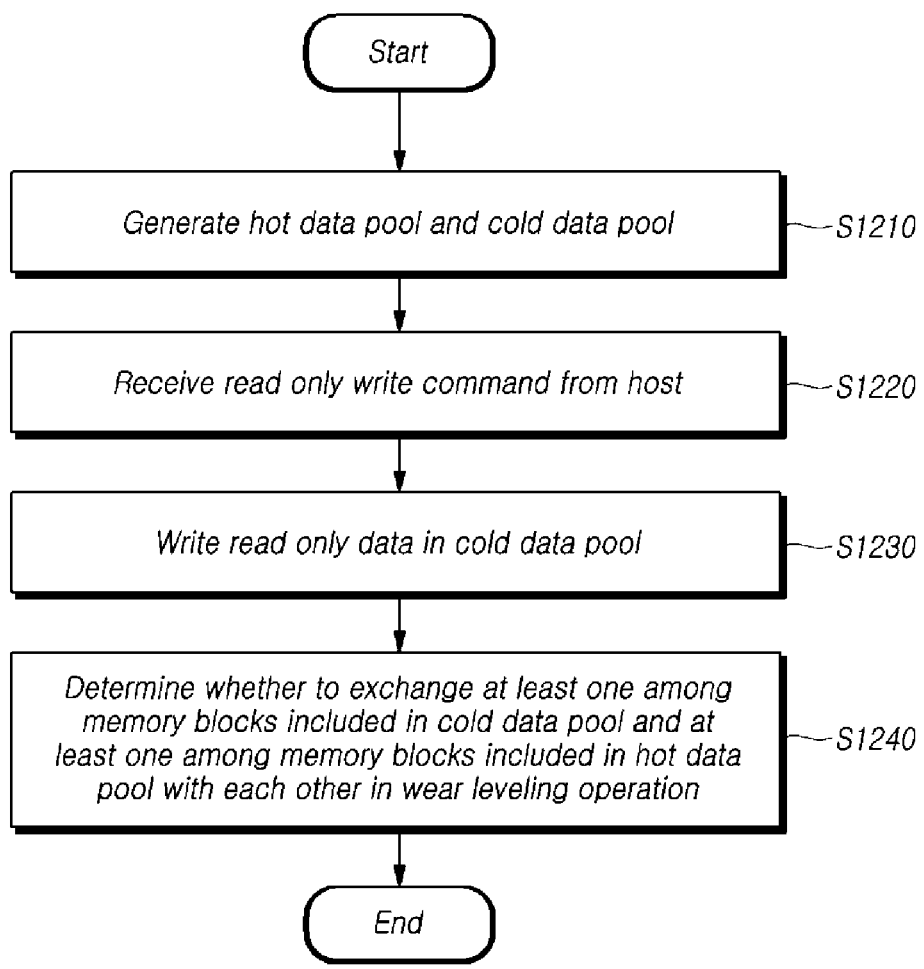
FIG. 12 is a flow chart to assist in the explanation of a method for operating the memory system in accordance with an embodiment of the disclosure.

FIG. 12 is a flow chart to assist in the explanation of a method for operating the memory system 100 in accordance with an embodiment of the disclosure.

The method for operating the memory system 100 may first include generating the hot data pool and the cold data pool, each of which includes at least one among the plurality of memory blocks in the memory device 110 (S1210).

The method for operating the memory system 100 may include receiving the read only write command (RO_W-R_CMD) from the host (S1220). The read only write command is a write command which instructs a write operation on read only data.

The method for operating the memory system 100 may include writing the read only data to the cold data pool (S1230).

Memory blocks included in the cold data pool may be excluded from target blocks of a garbage collection operation.

The method for operating the memory system 100 may further include determining whether to exchange at least one memory block in the cold data pool and at least one memory block in the hot data pool with each other, in a wear leveling operation (S1240).

At step S1240, when a maximum value among erase-write cycle counts for the memory blocks in the hot data pool is greater than a maximum value among erase-write cycle counts for the memory blocks in the cold data pool, at least one of the memory blocks in the cold data pool and at least one of the memory blocks in the hot data pool may be exchanged with each other.

A memory block having a minimum erase-write cycle count, among the memory blocks in the cold data pool, and a memory block having the maximum erase-write cycle count, among the memory blocks in the hot data pool, may be exchanged with each other.

The above-described operation of the memory controller 120 may be controlled by the control circuit 123, and may be performed in such a manner that the processor 124 executes (drives) a firmware to which general operations of the memory controller 120 are programmed.

Figure 13:
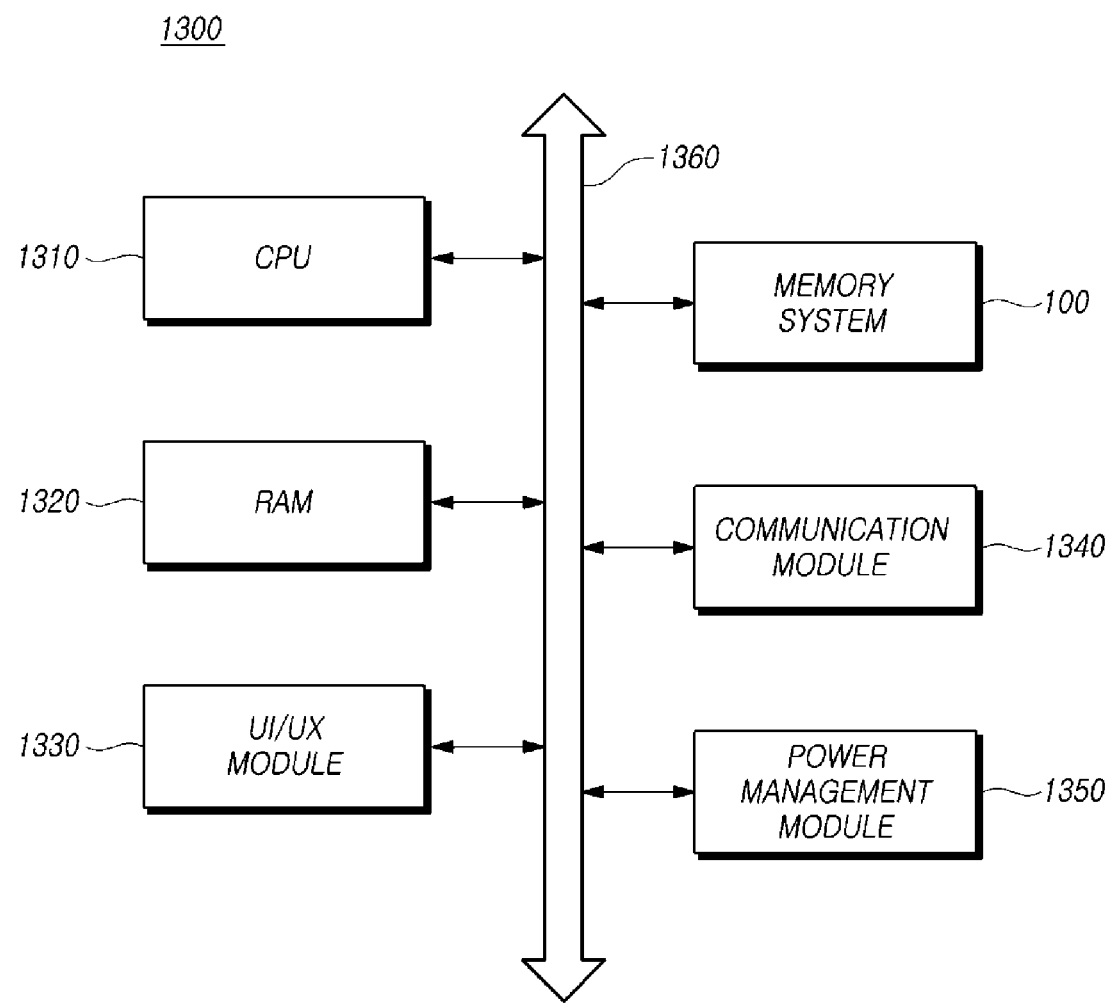
FIG. 13 is a diagram illustrating the configuration of a computing system according to an embodiment of the disclosure.

FIG. 13 is a diagram illustrating the configuration of a computing system 1300 according to an embodiment of the disclosure.

Referring to FIG. 13, the computing system 1300 may include: a memory system 100 electrically connected to a system bus 1360; a CPU 1310 configured to control the overall operation of the computing system 1300; a RAM 1320 configured to store data and information related to operations of the computing system 1300; a user interface/user experience (UI/UX) module 1330 configured to provide the user with a user environment; a communication module 1340 configured to communicate with an external device in a wired and/or wireless type; and a power management module 1350 configured to manage power used by the computing system 1300.

The computing system 1300 may be a personal computer (PC) or may include a mobile terminal such as a smartphone, a tablet or any of various other electronic devices.

The computing system 1300 may further include a battery for supplying an operating voltage, and may further include an application chipset, a graphic-related module, a camera image processor (CIS), and a DRAM. The computing system 1300 may include other elements as well, as those skilled in the art would understand.

The memory system 100 may be a device configured to store data in a magnetic disk such as a hard disk drive (HDD), or a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of various storage devices of various types and mounted inside various electronic devices.

According to embodiments of the present disclosure described above, the operation delay time of the memory system may be minimized. In addition, according to an embodiment of the disclosure, overhead occurring in the process of calling a specific function may be minimized. Although various embodiments of the present disclosure have been illustrated and described, those skilled in the art will appreciate that various modifications, additions and substitutions are possible, without departing from the scope and spirit of the invention as set forth in the accompanying claims. Therefore, embodiments of the present invention encompass all such modifications, additions and substitutions that fall within the scope of the claims.

What is claimed is:

1. A memory system comprising:
   a memory device including a plurality of memory blocks; and
   a memory controller configured to:
   control the memory device,
   manage a hot data pool including at least one of the plurality of memory blocks in which hot data is stored and a cold data pool including at least one of the plurality of memory blocks in which cold data is stored, each of which includes at least one among the plurality of memory blocks, and
   write, when receiving from a host a read only write command which instructs a write operation on read only data, the read only data to the cold data pool to manage the read only data as cold data,
   wherein the memory controller is further configured to determine whether a maximum value among erase-write cycle counts for the memory blocks in the hot data pool is greater than a maximum value among erase-write cycle counts for the memory blocks in the cold data pool, and
   exchange, in response to a determination that the maximum value among erase-write cycle counts for the memory blocks in the hot data pool is greater than the maximum value among erase-write cycle counts for the memory blocks in the cold data pool, at least one among memory blocks in the cold data pool and at least one among memory blocks in the hot data pool with each other, in a wear leveling operation.

2. The memory system according to claim 1, wherein the read only data is data for one among a multimedia file, an OS file and a library file.

3. The memory system according to claim 1, wherein the read only data is data which is determined, by the host, as being updated equal to or less than a set threshold count during a set time period.

4. The memory system according to claim 1, wherein the memory controller is further configured to exclude a memory block in the cold data pool from a target block of a garbage collection operation.

5. The memory system according to claim 1, wherein the memory controller exchanges a memory block having a minimum erase-write cycle count among the memory blocks in the cold data pool and a memory block having the maximum erase-write cycle count among the memory blocks in the hot data pool, with each other in the wear leveling operation.

6. A memory controller comprising:
   a memory interface configured to communicate with a memory device including a plurality of memory blocks; and
   a control circuit configured to:
   control the memory device,
   manage a hot data pool including at least one of the plurality of memory blocks in which hot data is stored and a cold data pool including at least one of the plurality of memory blocks in which cold data is stored, each of which includes at least one among the plurality of memory blocks, and
   write, when receiving from a host a read only write command which instructs a write operation on read only data, the read only data to the cold data pool to manage the read only data as cold data,
   wherein the control circuit is further configured to determine whether a maximum value among erase-write cycle counts for the memory blocks in the hot data pool is greater than a maximum value among erase-write cycle counts for the memory blocks in the cold data pool, and
   exchange, in response to a determination that the maximum value among erase-write cycle counts for the memory blocks in the hot data pool is greater than the maximum value among erase-write cycle counts for the memory blocks in the cold data pool, at least one among memory blocks in the cold data pool and at least one among memory blocks in the hot data pool with each other, in a wear leveling operation.

7. The memory controller according to claim 6, wherein the control circuit is further configured to exclude a memory block in the cold data pool from a target block of a garbage collection operation.

8. The memory controller according to claim 6, wherein the control circuit exchanges a memory block having a minimum erase-write cycle count among the memory blocks in the cold data pool and a memory block having the maximum erase-write cycle count among the memory blocks in the hot data pool, with each other in the wear leveling operation.

9. A method for operating a memory system, comprising:
   generating a hot data pool including at least one of the plurality of memory blocks in which hot data is stored and a cold data pool including at least one of the plurality of memory blocks in which cold data is stored, each of which includes at least one among a plurality of memory blocks included in a memory device;

receiving, from a host, a read only write command which instructs a write operation on read only data;

writing the read only data to the cold data pool to manage the read only data as cold data;

determining whether a maximum value among erase-write cycle counts for the memory blocks in the hot data pool is greater than a maximum value among erase-write cycle counts for the memory blocks in the cold data pool; and exchanging, in response to a determination that the maximum value among erase-write cycle counts for the memory blocks in the hot data pool is greater than the maximum value among erase-write cycle counts for the memory blocks in the cold data pool, at least one among memory blocks in the cold data pool and at least one among memory blocks in the hot data pool with each other, in a wear leveling operation.

10. The method according to claim 9, further comprising: excluding a memory block in the cold data pool from a target block of a garbage collection operation.

11. The method according to claim 9, wherein a memory block having a minimum erase-write cycle count among the memory blocks in the cold data pool and a memory block having the maximum erase-write cycle count among the memory blocks in the hot data pool are exchanged with each other in the wear leveling operation.

* * * * *